United States Patent
Collins et al.

(10) Patent No.: US 10,380,588 B2
(45) Date of Patent: Aug. 13, 2019

(54) PASSIVE CARDHOLDER VERIFICATION METHOD IN MOBILE DEVICE

(71) Applicant: MasterCard International Incorporated, Purchase, NY (US)

(72) Inventors: Simon Collins, Surrey (GB); Ian Maddocks, Milton Keynes (GB)

(73) Assignee: Mastercard International Incorporated, Purchase, NY (US)

( * ) Notice: Subject to any disclaimer, the term of this patent is extended or adjusted under 35 U.S.C. 154(b) by 908 days.

(21) Appl. No.: 14/276,071

(22) Filed: May 13, 2014

(65) Prior Publication Data
US 2015/0332271 A1    Nov. 19, 2015

(51) Int. Cl.
G06Q 40/00 (2012.01)
G06Q 20/40 (2012.01)
G06Q 20/32 (2012.01)
G06Q 20/20 (2012.01)

(52) U.S. Cl.
CPC ......... *G06Q 20/4012* (2013.01); *G06Q 20/20* (2013.01); *G06Q 20/322* (2013.01); *G06Q 20/3278* (2013.01); *G06Q 20/40145* (2013.01)

(58) Field of Classification Search
CPC .................................................. G06Q 40/00
USPC ............................................. 705/44, 16, 41
See application file for complete search history.

(56) References Cited

U.S. PATENT DOCUMENTS

| | | | |
|---|---|---|---|
| 2010/0248779 A1* | 9/2010 | Phillips | G06Q 20/32 455/556.1 |
| 2011/0112918 A1* | 5/2011 | Mestre | G06Q 20/20 705/16 |
| 2012/0084206 A1 | 4/2012 | Mehew et al. | |
| 2012/0197796 A1 | 8/2012 | Dent et al. | |
| 2014/0244496 A1* | 8/2014 | Langus | G06Q 20/3674 705/41 |

OTHER PUBLICATIONS

"Notification of Transmittal of the International Search Report and the Written Opinion of the International Searching Authority, or the Declaration", dated Aug. 12, 2015, for International Application No. PCT/US15/30539, 7pgs.

* cited by examiner

*Primary Examiner* — Ojo O Oyebisi
(74) *Attorney, Agent, or Firm* — Buckley, Maschoff & Talwalkar LLC (57) ABSTRACT

In a payment-enabled smartphone, a customer verification method (CVM) may be performed without prompting the user to provide any input. An outcome of the resulting passive CVM process may be an input to a risk based decision process performed by the smartphone, by a point of sale terminal and/or by an issuer of a payment card account accessed via the payment-enabled smartphone. The risk based decision process may determine whether a payment transaction is approved or declined.

12 Claims, 7 Drawing Sheets

PASSIVE CARDHOLDER VERIFICATION METHOD IN MOBILE DEVICE

BACKGROUND

Payment cards such as credit cards and debit cards are in widespread use. In some environments, payment cards in the form of magnetic stripe cards prevail in terms of popularity. In other environments, it is more common to use so-called "contactless" payment cards. With contactless payment cards, the payment card account number is stored in an integrated circuit (IC) within the card, and is read by short-range radio communication between the card and the contactless reader component of a point of sale (POS) terminal. With enhancements that have occurred to mobile phones, including smartphones, the capability has been added to perform NFC (near field communication) communications to enable so-called "contactless" payment cards to be digitized into these consumer devices. These mobile devices may utilize a secure element (SE) to store the payment card account number and associated data, keys and Personal Identification Number (PIN) to enable the consumer to perform a payment transaction using the NFC short-range radio communications provided by the mobile device and the contactless reader component of a POS terminal.

For many payment transactions utilizing payment-enabled mobile phones, it is customary to require "two factor" security—that is, the user must not only present a physical credential (the mobile phone), but in addition a procedure must be followed to verify that the individual presenting the credential is authorized to do so. This additional required procedure is sometimes referred to in the payment card industry as a "cardholder verification method", or "CVM". A widely used CVM prompts the user to enter a "PIN", i.e., a "personal identification number"; for example this may be done via the user interface of the mobile phone. If the PIN, as entered by the user, is determined to be correct, either on-device, locally, or at a remote server, then the CVM requirement is considered to have been satisfied. There have also been many proposals for CVM requirements in which the user submits biometric information via the mobile phone.

The present inventors have now recognized that there are opportunities to increase the convenience and/or the sophistication of CVM processes for payment-enabled mobile phones and other mobile devices.

BRIEF DESCRIPTION OF THE DRAWINGS

Features and advantages of some embodiments of the present disclosure, and the manner in which the same are accomplished, will become more readily apparent upon consideration of the following detailed description of the disclosure taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present disclosure, a payment-enabled mobile device applies one or more "passive" CVM processes on an ongoing basis to provide a primary or supplemental assurance that the payment-enabled mobile device remains in the possession of the authorized user. The term "passive", in this context and in the ensuing discussion and appended claims, shall be understood to mean that the user is not prompted to submit input to the CVM process. Among other possible CVM processes that may occur in accordance of teachings of this disclosure, there may be an automated facial recognition of the user via a forward-facing camera on the payment-enabled mobile device and/or a voice recognition algorithm applied to the user's utterances during telephone calls using the device and/or an analysis of the user's gait while walking, as detected via one or more motion sensing components of the device. The passive CVM process may occur in background to other processes implemented by the device, such that the user is not even aware that the passive CVM process is occurring.

In some embodiments, passive/background CVM processing may be deployed in conjunction with selective requirements for active CVM compliance as part of a risk management strategy that may achieve a superior balance of user convenience with achievement of the risk management goals of payment card account issuers.

Figure 1:
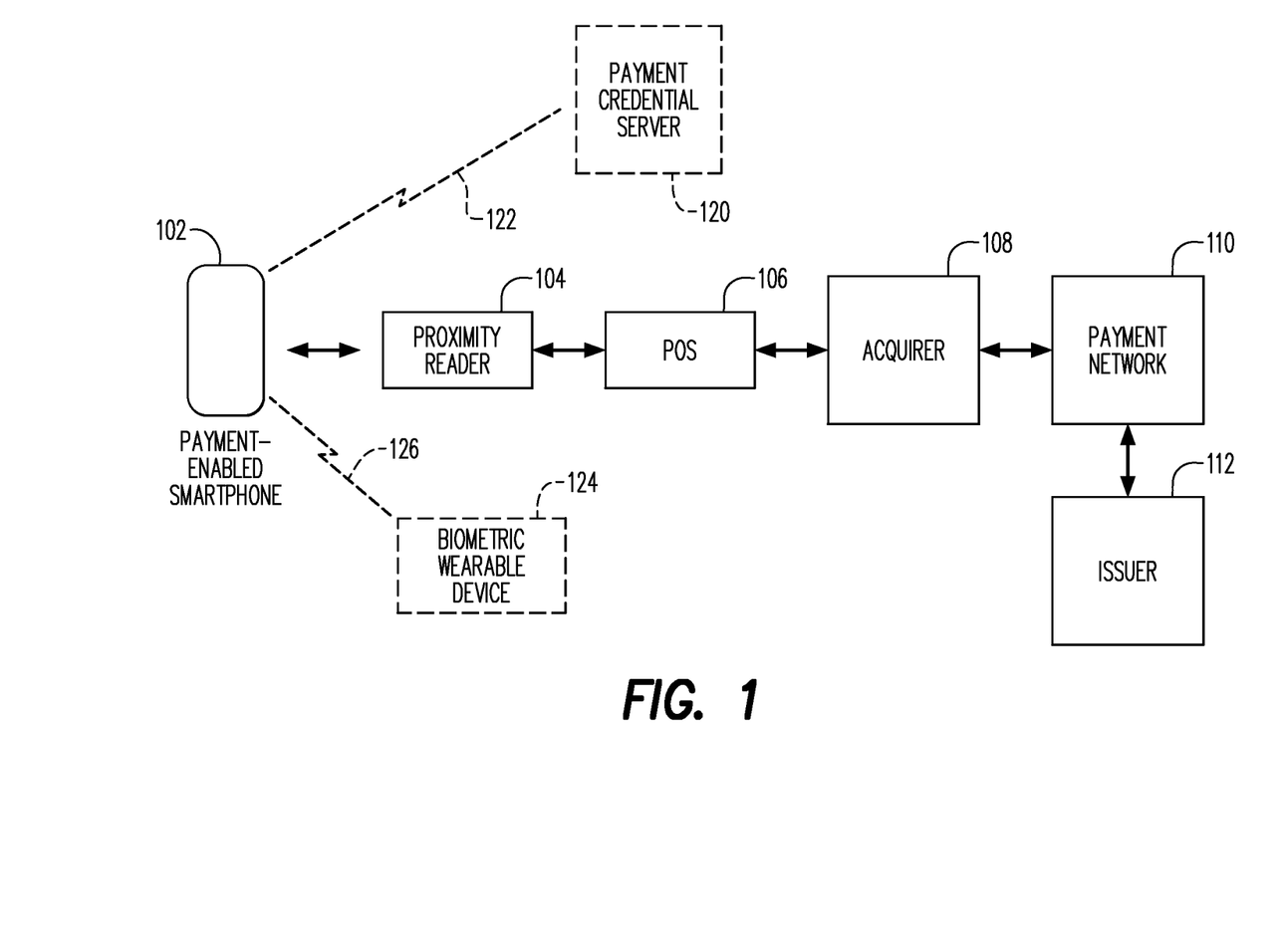
FIG. 1 is a block diagram that illustrates a system in which the present disclosure may be applied.

FIG. 1 is a block diagram that illustrates a payment system 100 in which teachings of the present disclosure may be applied.

The payment system 100 includes a payment-enabled smartphone 102. The smartphone 102 may be operable as a mobile telephone, while also being able to perform functions of a payment device and also embodying passive CVM functionality as provided in accordance with aspects of the present disclosure and as described below. Further details of the smartphone 102 are described below in conjunction with FIGS. 2-5.

The payment system 100 further includes a proximity reader component 104 associated with a POS terminal 106. The proximity reader component 104 and the POS terminal 106 may be substantially or entirely conventional. In some embodiments, both the proximity reader component 104 and the smartphone 102 may include capabilities for NFC communication, so that those two devices may engage in communication with each other in accordance with the NFC standard. In other embodiments, one or more other methods of communication may take place between the smartphone 102 and the proximity reader component 104 instead of or in addition to NFC communication; such communications may result in the mobile device transacting with a reader component 104 through the internet. As is well known, communication between the smartphone 102 and the proximity reader component 104 may be initiated by the user (not shown) tapping the smartphone 102 on an appropriate location on the housing (not separately shown) of the proximity reader component 104.

The proximity reader component 104 and the POS terminal 106 may be located at the premises of a retail store and operated by a sales associate of the retailer for the purpose of processing retail transactions. The smartphone 102 is shown in FIG. 1 to be interacting with the proximity reader component 104 and the POS terminal 106 for the purpose of executing such a transaction.

A computer 108 operated by an acquirer (acquiring financial institution) is also shown as part of the system 100 in FIG. 1. The acquirer computer 108 may operate in a conventional manner to receive an authorization request for the transaction from the POS terminal 106. The acquirer computer 108 may route the authorization request via a payment network 110 to the server computer 112 operated by the issuer of a payment card account that is available for access by the smartphone 102. Also in a conventional manner, the authorization response generated by the payment card issuer server computer 112 may be routed back to the POS terminal 106 via the payment network 110 and the acquirer computer 108.

The payment network 110 may be entirely or substantially conventional; one example of a suitable payment network is the well-known Banknet system operated by MasterCard International Incorporated, which is the assignee hereof.

The payment card issuer server computer 112 may be conventional and may be operated by or on behalf of a financial institution ("FI"; not separately shown) that issues payment card accounts to individual users. For example, the payment card issuer server computer 112 may perform conventional functions, such as (a) receiving and responding to requests for authorization of payment card account transactions to be charged to payment card accounts issued by the FI; and (b) tracking and storing transactions and maintaining account records.

Although the POS terminal 106 and the payment card issuer server computer 112 may be conventional in some embodiments, in other embodiments one or more of those devices may be programmed to receive passive CVM information provided by the payment-enabled smartphone 102, and to use the passive CVM information as a factor in a risk based decision (RBD) as to whether the transaction should be allowed to occur.

Those who are skilled in the art will appreciate that, assuming the authorization response indicates that all is in order, the purchase transaction may be completed at the point of sale. Moreover, the payment network 110 may facilitate a subsequent clearing process that results in a charge to the user's payment card account issued by the issuing FI and a credit to the bank account (at the acquiring FI) that belongs to the merchant that operates the POS terminal 106.

Also shown in FIG. 1 is a remote payment credential server 120 that may be available in some embodiments for over-the-air interaction with the payment-enabled smartphone 102. As will be further discussed below, the payment credential server 120 may aid in realizing a cloud-based implementation of aspects of the present disclosure.

Communication between the payment-enabled smartphone 102 and the remote server may take place via the over-the-air communication channel indicated by reference numeral 122.

As discussed in more detail below, in some embodiments the passive CVM functionality of the smartphone 102 may depend at least in part on a biometric signal received by the smartphone 102 from another device. Such a separate device may be, for example, a wearable device (reference numeral 124 in FIG. 1) that is worn by a user of the smartphone 102 and that may be, for example, a wristwatch/wristband heartbeat monitor. The smartphone 102 may be in communication with the biometric wearable device 124 via a short-range wireless communication channel 126 (Bluetooth, e.g.).

The components of the payment system 100 as depicted in FIG. 1 are only those that are needed for processing a single transaction. A typical practical embodiment of the payment system 100 may process many purchase transactions (including simultaneous transactions) and may include a considerable number of payment card issuers and their computers, a considerable number of acquirers and their computers, and numerous merchants and their POS terminals and associated proximity reader components. The system may also include a very large number of payment card account holders, who carry payment-enabled mobile devices (such as the smartphone 102 described herein) and/or payment cards (including contactless payment cards and/or magnetic stripe cards). If cloud-based HCE is employed, there may be more than one remote server 120 that supports such functionality.

It should also be understood that the smartphone 102 is operable as a conventional mobile telephone for communication—both voice and data—over a conventional mobile telecommunications network, which is not depicted in the drawing. Thus, the smartphone 102 may be in communication from time to time in a conventional manner with a mobile network operator ("MNO"—also not shown). An over-the air communication channel (like the channel 122 shown in FIG. 1) between the smartphone 102 and the payment card issuer server computer 112 (or a related computer) may be established from time to time for purposes such as personalization, set up, etc. with respect to the smartphone 102.

Figure 2:
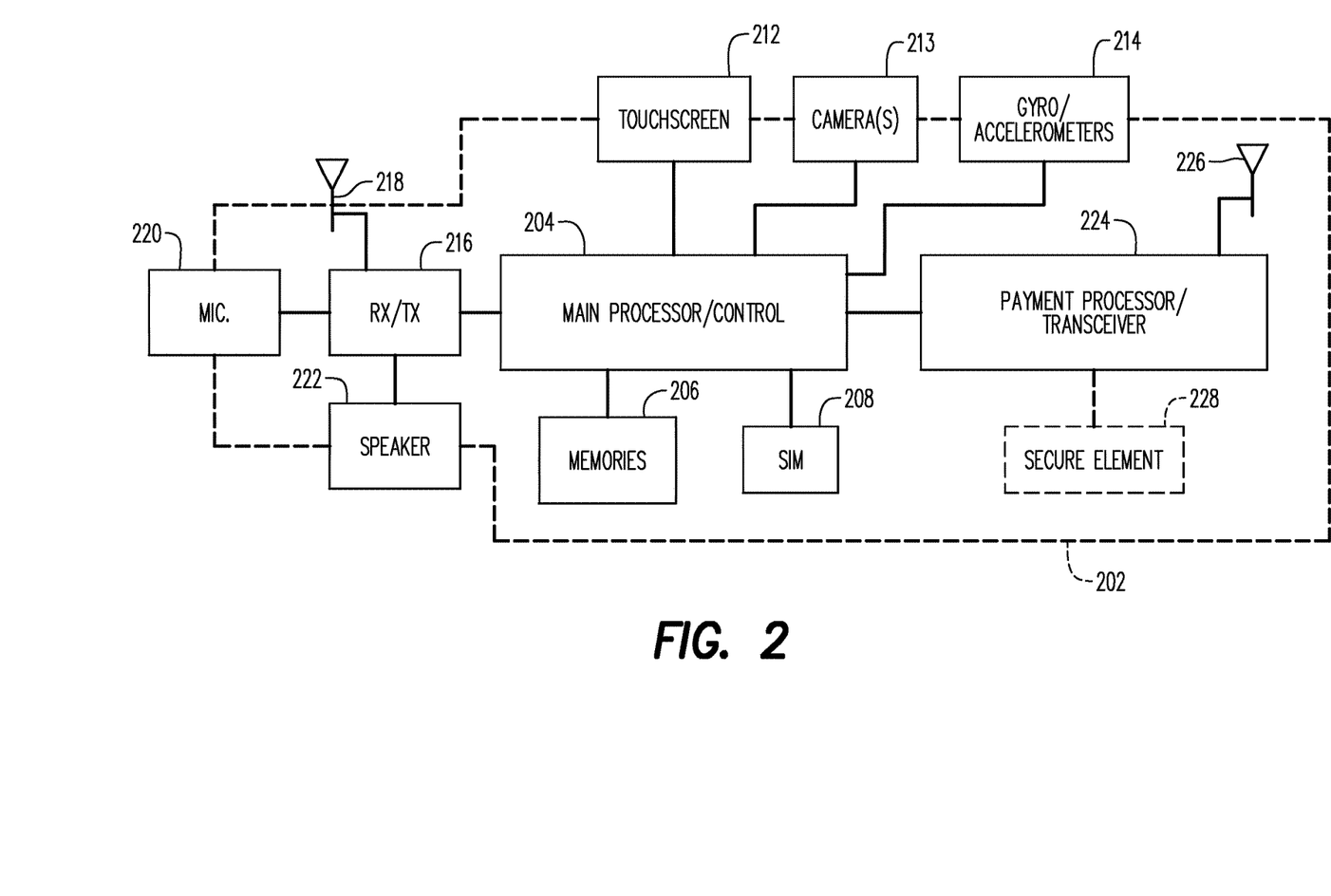
FIG. 2 is a block diagram that illustrates an example embodiment of a payment-enabled smartphone provided in accordance with aspects of the present disclosure.

FIG. 2 is a block diagram that illustrates an example embodiment of the payment-enabled smartphone 102 shown in FIG. 1 and provided in accordance with aspects of the present disclosure. The smartphone 102 may be conventional in its hardware aspects. For example, the smartphone 102 may resemble, in most or all of its hardware aspects and many of its functions, a conventional "iPhone" marketed by Apple Inc., or one of the numerous smartphone models that run the "Android" operating system.

The smartphone 102 may include a conventional housing (indicated by dashed line 202 in FIG. 2) that contains and/or supports the other components of the smartphone 102. The housing 202 may be shaped and sized to be held in a user's hand, and may for example exhibit the type of form factor that is common with the current generation of smartphones.

The smartphone 102 further includes conventional control circuitry 204, for controlling over-all operation of the smartphone 102. For example, the control circuitry 204 may include a conventional processor of the type designed to be the "brains" of a smartphone.

Other components of the smartphone 102, which are in communication with and/or controlled by the control circuitry 204, include: (a) one or more memory devices 206 (e.g., program and working memory, etc.); (b) a conventional SIM (subscriber identification module) card 208; and (c) a conventional touchscreen 212 which serves as the primary input/output device for the smartphone 102, and which thus receives input information from the user and displays output information to the user. As is the case with many models of smartphones, in some embodiments the smartphone 102 may also include a few physically-actuatable switches/controls (not shown), such as an on/off/reset switch, a menu button, a "back" button, a volume control switch, etc.

In some embodiments of the smartphone 102, as has become conventional, its components may include two cameras (reference numeral 213), including one camera (not separately shown) that faces towards the user at times when the user is viewing the touchscreen 212. The latter camera will hereinafter be referred to as the forward-facing camera 213.

Furthermore, as is also conventional, the components of the smartphone 102 may include one or more accelerometers 214.

The smartphone 102 also includes conventional receive/transmit circuitry 216 that is also in communication with and/or controlled by the control circuitry 204. The receive/transmit circuitry 216 is coupled to an antenna 218 and provides the communication channel(s) by which the smartphone 102 communicates via the mobile telephone communication network (not shown). The receive/transmit circuitry 216 may operate both to receive and transmit voice signals, in addition to performing data communication functions.

The smartphone 102 further includes a conventional microphone 220, coupled to the receive/transmit circuitry 216. Of course, the microphone 220 is for receiving voice input from the user. In addition, a loudspeaker 222 is included to provide sound output to the user, and is coupled to the receive/transmit circuitry 216.

The receive/transmit circuitry 216 may operate in a conventional fashion to transmit, via the antenna 218, voice signals generated by the microphone 220, and to reproduce, via the loudspeaker 222, voice signals received via the antenna 218. The receive/transmit circuitry 216 may also handle transmission and reception of text messages and other data communications via the antenna 218.

In some embodiments, via a connection that is not explicitly shown, voice signals input by the user via the microphone 220 may be supplied in digital form to the control circuitry 202 or other processing capability of the smartphone 202 to allow for analysis of the voice signals by the smartphone 102.

The smartphone 102 may also include circuitry 224 that is partly or wholly dedicated to implementing the NFC communications circuitry functionality of the smartphone 102. The smartphone 102 may further include a loop antenna 226, coupled to the NFC circuitry 224. In some embodiments, the NFC circuitry 224 may partially overlap with the control circuitry 204 for the smartphone 102.

In some embodiments, the NFC circuitry 224 is associated with, and may also overlap with, a secure element 228, or the NFC circuitry could be omitted in embodiments that do not utilize NFC. While secure elements have been proposed for incorporation with some payment-enabled smartphones, there have been other proposals that provide a desirable secure processing environment without a physically separate element. Accordingly, the secure element 228 is shown in phantom, as an optional component of the smartphone 102.

The term "secure element" is well known to those who are skilled in the art, and typically refers to a device that may include a small processor and volatile and nonvolatile memory (not separately shown) that are secured from tampering and/or reprogramming by suitable measures. In some embodiments, the secure element 228 may be provided as part of the SIM card 208. In other embodiments, the secure element 228 may be constituted by an integrated circuit card separate from the SIM card 208 but possibly having the same form factor as the SIM card 208. In some embodiments of the smartphone 102, the secure element 228 may be conventional in its hardware aspects but may be programmed in accordance with aspects of the present disclosure in a manner to be described below. (It should be noted that the term "secure element" is not intended to be limited to devices that are IC-based, but rather may also include any secure execution environment in a mobile device, and may include software based secure execution environments running on the main mobile device processor.) As an alternative to providing a physically-separate secure element, in some embodiments of the smartphone 102 the main control circuitry may be programmed to execute the payment processing functionality in full or in part with access from the smartphone 102 to the payment credential server 120. As another alternative, one or more aspects of a conventional secure element may be implemented on the main processor of the smartphone 102. For example, in some embodiments the known technique of host card emulation (HCE) may be employed. In further embodiments, the payment functionality may reside in a Trusted Execution Environment (TEE). Hereinafter, when functionality is ascribed to the secure element 228, it should be borne in mind that at least some of such functionality may alternatively reside in the main processor of the smartphone 102, the smartphone's TEE, and/or in the payment credential server 120.

Figure 2A:
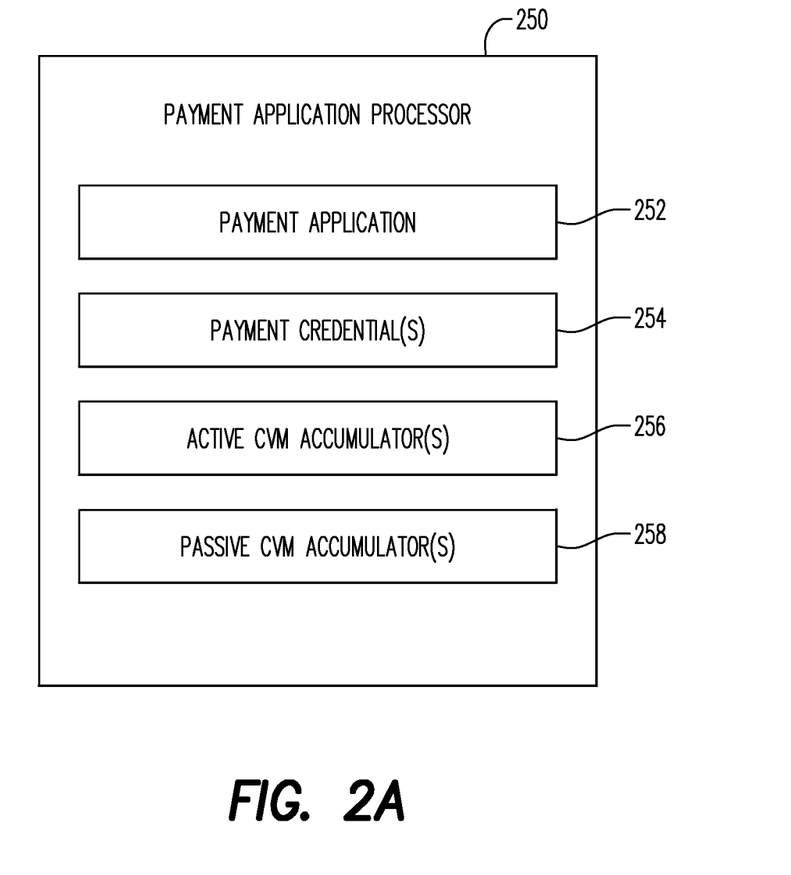
FIG. 2A is a diagram that shows some details of the system of FIG. 1, as provided in accordance with some embodiments.

FIG. 2A is a diagram that shows some details of the payment-enabled smartphone 102, and/or the payment credential server 120, as provided in accordance with some embodiments. FIG. 2A shows a payment application processor 250, which may be implemented in whole or in part by one or more of the secure element 228 (if present), the main processor/control circuit 204, and/or the payment credential server 120. The payment application processor 250 may run a payment application 252. In some of its aspects, the payment application 252 may program the payment application processor 250 to implement CVM functionality in accordance with teachings of this disclosure and as described below in connection with FIGS. 3-5.

The payment application processor 250 may also store one or more payment credentials 254, such as one or more primary account numbers (PANs) and/or payment tokens that represent or point to one or more payment card accounts issued to the user of the smartphone 102, as well as associated information such as encryption keys.

Still further, the payment application processor 250 may store one or more accumulators 256 that are utilized by the payment application 252 in applying risk management strategies that involve an "active" CVM process (i.e., a CVM process in which the user is prompted to provide an input such as a PIN).

In addition, the payment application processor 250 may store one or more accumulators 258 that are utilized by the payment application 252 in applying risk management strategies that involve a passive CVM process in accordance with teachings of this disclosure.

Figure 4A:
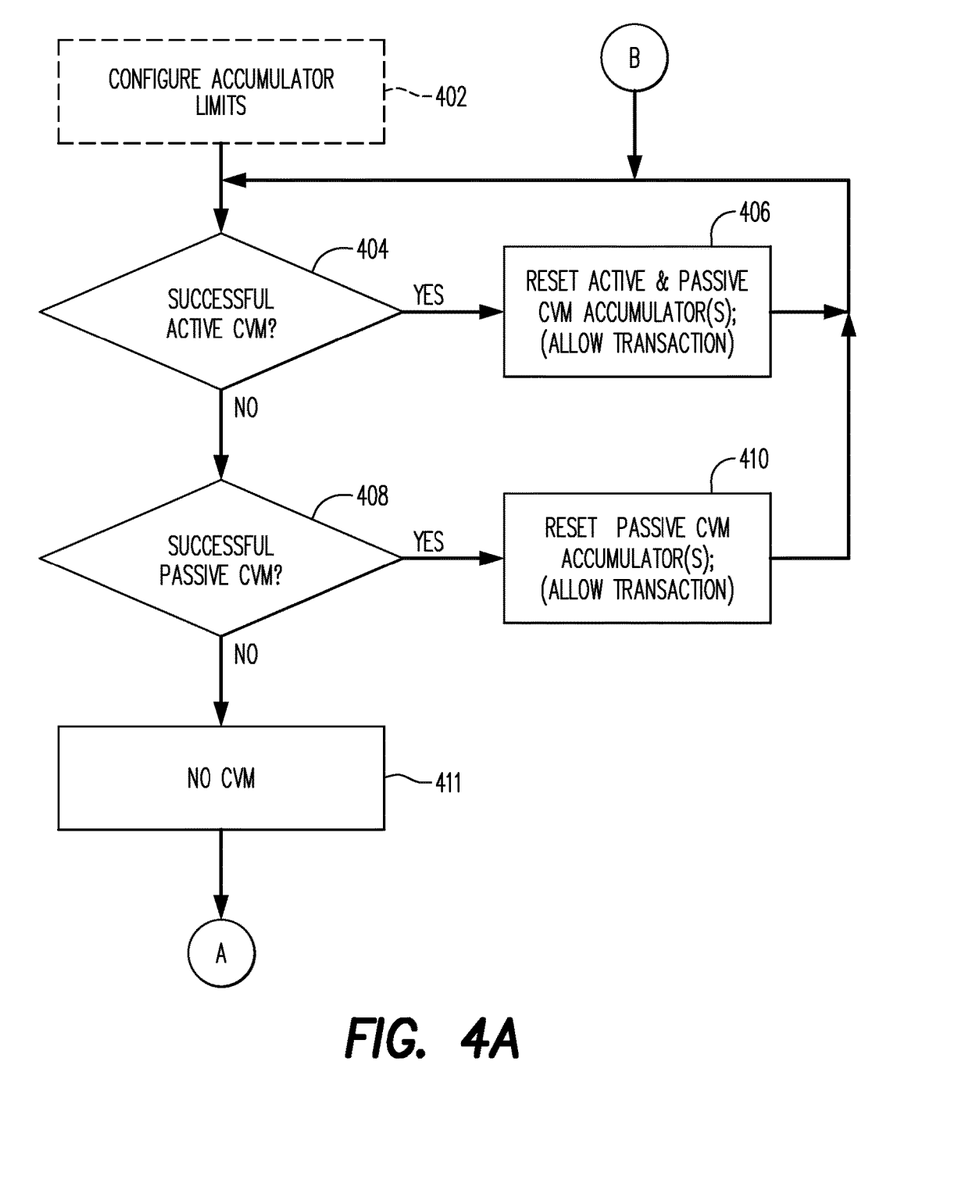
Figure 4B:
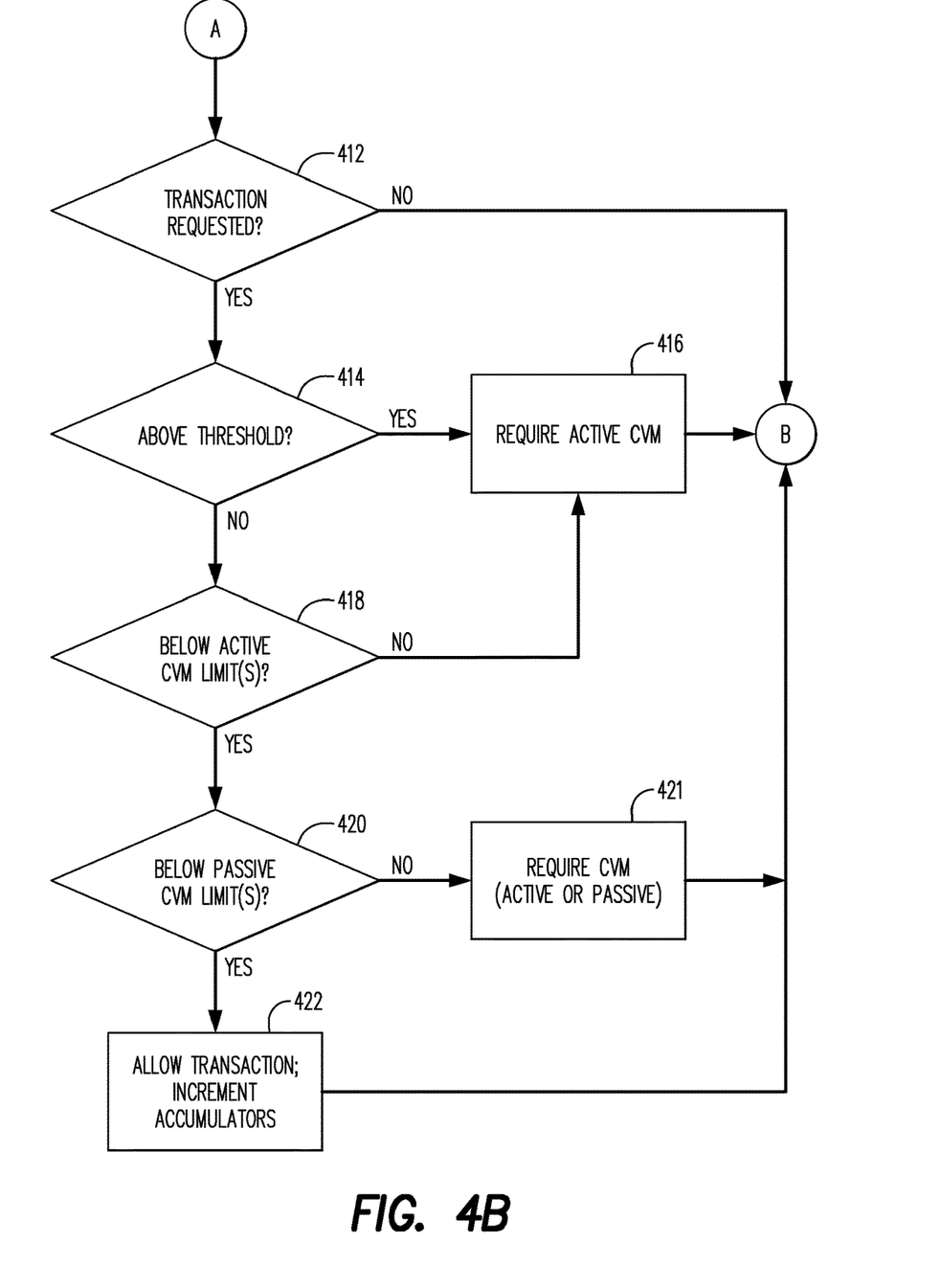
Figure 5:
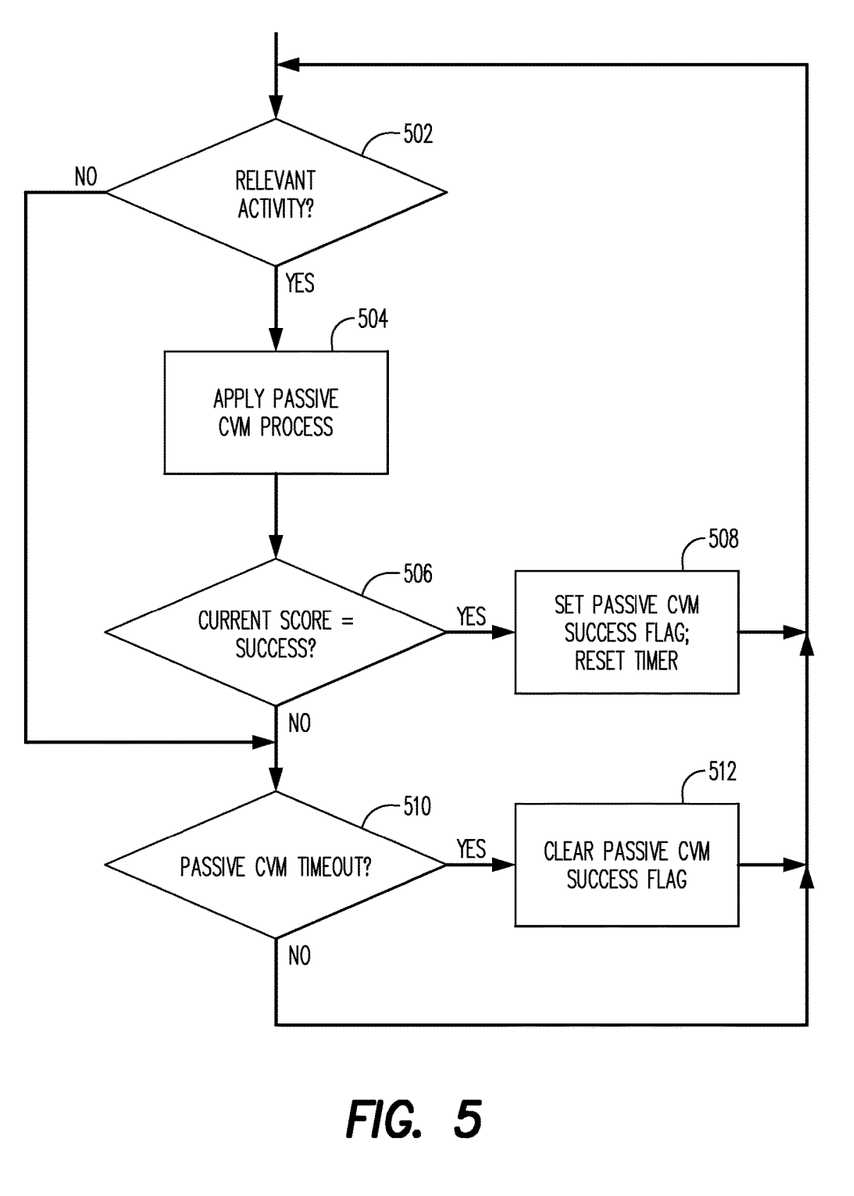

The ensuing discussion of FIGS. 4A/4B and 5 will describe the payment application's use of and interaction with the accumulators 256 and 258.

Figure 3:
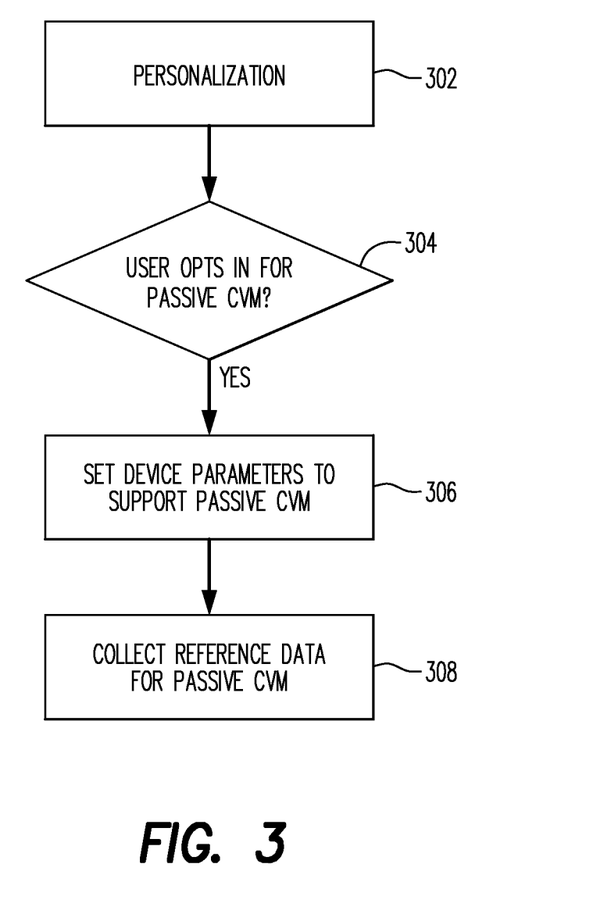
FIGS. 3-5 are flow charts that illustrate processes that may be performed by or in connection with the smartphone of FIG. 2 according to aspects of the present disclosure.

FIG. 3 is a flow chart that illustrates, at a high level, a process performed in the smartphone 102 in connection with set-up of the device and loading of required data, programs and settings.

At 302 in FIG. 3, the smartphone 102 is subjected to a personalization process. The concept of personalization is well known to those who are skilled in the art, and may typically entail downloading, e.g., a payment application and one or more payment credentials. In the case of the smartphone 102 as disclosed herein, the payment application may include passive CVM functionality as described herein, and the personalization may also include setting of parameters suitable for use in a risk management strategy or strategies that utilize passive CVM in accordance with teachings of this disclosure.

At decision block 304, the smartphone 102 determines whether the user has indicated that he/she opts in for use of passive CVM. The user may do so, for example, in response to a proposal from the user's payment card account issuer. Such a proposal may convey to the user certain advantages (e.g., enhanced convenience, and/or access to certain mobile payment capabilities) that will accrue to him or her by agreeing to enable passive CVM processing in the smartphone 102. The user may communicate his/her intention to opt in via a suitable interaction with the user interface of the smartphone 102.

If the smartphone 102 makes a positive determination at decision block 304 (i.e., if the smartphone 102 determines that the user has opted in to enable passive CVM processing), then block 306 may follow decision block 304. At block 306, operating parameters of the smartphone 102 are set in such a manner as to facilitate passive CVM processing in accordance with one or more examples as described below. For example, an operating parameter may be set such that the forward-facing camera 213 remains constantly enabled as long as the smartphone is on; or alternatively, for as long as the touchscreen 212 is on. In this way, it can be relatively assured that the forward-facing camera is operative when an image of the user's face is available for capture to permit facial recognition processing.

Similarly, an operating parameter for of the smartphone 102 may be set such that the accelerometers are continuously enabled while the smartphone is turned on. This may facilitate availability of the supply of data from the accelerometers to allow for analysis of the user's walking gait a substantial proportion of the time when the user is actually walking around with the smartphone 102 in his/her possession.

In general, then, the operating parameters/settings for the smartphone 102 may be set at 306 so as to keep the necessary components of the device available to supply input data for passive CVM processing.

In block 308, the smartphone 102 may collect reference data required for subsequent passive CVM processing. For example, the user may be prompted to take a "selfie" (photo of his/her own face) to serve as a reference image for facial recognition processing that would verify subsequent images of the user's face. As another example, relative to a voice recognition CVM process, the smartphone 102 may automatically collect and/or analyze the first N minutes of speech input into the microphone 220 during phone calls utilizing the smartphone during the period after personalization (block 302) has occurred. From this analysis, the smartphone 102 may extract voice characteristic parameters in a conventional manner to provide a reference profile for the user's voice.

As another example, in regard to a gait analysis process, the smartphone 102 may capture and/or analyze accelerometer output data for the first M minutes of motion patterns consistent with walking motion in the period after personalization. This analysis may be done in such a manner as to produce a reference profile for identifying the user's walking gait.

The smartphone 102 may also collect other reference data as needed to support other types of passive CVM processing utilized by the smartphone 102.

In some embodiments, the smartphone 102 may utilize one or more passive CVM processes as an exclusive manner of establishing that the user is authorized to use the smartphone 102 for payment purposes. In other embodiments, however, passive CVM processing may constitute a portion of a risk management approach that also utilizes active CVM (e.g., PIN entry and verification) at some times or in some situations. In some embodiments, passive CVM processing may be used as a complement to active CVM. For example, in an example embodiment illustrated in FIGS. 4A, 4B and 5, relatively high value transactions may all require successful PIN entry, but a number of relatively small transactions may be allowed without PIN entry as long as a passive CVM process appears to indicate that the smartphone 102 remains in the authorized user's possession. In still other embodiments, the current evaluation by the smartphone 102 as to whether passive CVM is satisfied may be used as one input to a relatively complex RBD (risk based decision) process. The RBD process may be carried out at one or more of (a) the smartphone itself; (b) the point of sale; or (c) the payment card account issuer. Other factors in the RBD process may include, for example, type of merchant, location, time of day, amount of transaction, recent transaction history, etc.

In the process of FIGS. 4A, 4B and 5, the above-mentioned CVM accumulators 256 and 258 (FIG. 2A) are used to track how many and/or what cumulative monetary amount of transactions has occurred since the most recent successful active or passive CVM process, as the case may be. The process steps shown in FIGS. 4A/4B and 5 may in some embodiments be performed in the secure element 228, if present. In other embodiments, as suggested above, at least a portion of the processing logic may be performed in the main processor (control circuitry 204) of the smartphone 102 or in the payment credential server 120. FIGS. 4A and 4B together form a flow chart of a process that uses both active and passive CVM for risk management, while FIG. 5 shows some additional details of the process of FIGS. 4A/4B.

Block 402 in FIG. 4A represents setting limits for one or more of the CVM accumulators. The limits define, for each accumulator, what accumulator value triggers a requirement for a successful CVM process. The limits may be set, for example, during personalization (block 302, FIG. 3).

At decision block 404 in FIG. 4A, the smartphone 102 may determine whether an active CVM process has been successfully completed. For example, to make this determination, the smartphone 102 may prompt the user to enter a PIN and the smartphone (or other system component) may determine whether the PIN as entered is correct. If there is a positive determination at 404 (i.e., successful active CVM has occurred), then the process may advance from decision block 404 to block 406. At block 406, the smartphone 102 may reset all of the accumulators for both active and passive CVM processes. If a transaction is currently pending, block 406 may also include allowing the transaction to be completed.

In some embodiments of the process flow, decision block 408 may follow in the absence of a successful active CVM. At decision block 408, the smartphone 102 may determine whether the current status of the passive CVM process is indicative of the smartphone being in the possession of the authorized user. If so, then block 410 may follow decision block 408 in the process flow. At block 410, the smartphone 102 may reset (i.e., clear) the accumulators that are relevant to requiring successful passive CVM. If a transaction is currently pending, block 410 may also include allowing the transaction to be completed.

Considering again decision block 408, in the absence of a successful passive CVM, block 411 may follow decision block 408. At block 411, the current status of the process is that no successful CVM has occurred. If a transaction that requires CVM is currently pending, the transaction will not be permitted to go forward.

A decision block 412 (FIG. 4B) may follow block 410 of FIG. 4A to complete a loop comprising decision blocks 404, 408 and 412. In the absence of a positive determination at one of those decision blocks, the process may, in effect, idle (perhaps as one thread among many), without the CVM accumulators being reset. At decision block 412, the smartphone 102 may determine whether the user is attempting to engage in a payment transaction using the smartphone. (From prior discussion, it will be appreciated that an attempt to engage in a transaction may involve tapping the smartphone 102 on the proximity reader 104 (FIG. 1).) If a positive determination is made at block 412 in FIG. 4B (i.e., if the smartphone 102 determines that a transaction is being attempted), then the process flow may advance from decision block 412 to decision block 414 in FIG. 4B.

At decision block 414, the smartphone 102 may determine whether the attempted transaction is for a monetary amount that is above a threshold. In particular the threshold may be such as to demarcate between transactions for which successful active CVM will always be required and transactions that will sometimes be allowed without active CVM. In some embodiments, for example, the risk management strategy may set the threshold at a level such as USD 50.00 or 25.00 or the like, with transactions below the threshold being deemed "low value" transactions. The risk management strategy may hold that a certain number of "low value" transactions (and/or a certain cumulative amount of "low value" transactions) may occur before requiring active CVM. The risk management strategy may further hold that a smaller number (and/or a lower cumulative amount) of "low value" transactions may be permitted in the absence of passive CVM having been satisfied. It will be understood that the accumulator limits set at 402 may have been set to implement such a risk management strategy.

Continuing to refer to FIG. 4B, if a positive determination is made at decision block 414 (i.e., if it is determined that the transaction amount is above the "low value" threshold), then the process flow may advance from decision block 414 to block 416 in FIG. 4B. At block 416, the smartphone may require compliance with active CVM and may prompt the user accordingly (e.g., by indicating that he/she should enter his/her PIN). From block 416, the process flow may loop to decision block 404 in FIG. 4A.

Considering decision block 414 (FIG. 4B) again, if a negative determination is made at that decision block (i.e., if the transaction does not exceed the relevant threshold, and therefore is in the "low value" category), then the process flow may advance from decision block 414 to decision block 418. Decision block 418 is concerned with comparing one or more of the active CVM accumulators with the relevant limit(s) established at 402. In some embodiments, if the current transaction would cause the accumulator value(s) to exceed the relevant limit(s), then the process flow would follow the "no" branch (i.e., the outcome is not below the established limit(s)) such that the process flow loops to block 416, as described above (resulting in a requirement for an active CVM).

On the other hand, if—even with the new transaction amount—the active CVM accumulator(s) would remain below the relevant limit(s), then the process flow may advance from decision block 418 to decision block 420. Decision block 420 is concerned with comparing one or more of the passive CVM accumulators with the relevant limit(s) for those accumulators as established at 402. In some embodiments, if the current transaction would cause the passive CVM accumulator value(s) to exceed the relevant limit(s) then the process flow would follow the "no" branch such that the process flow may advance from decision block 420 to block 421. At block 421 the process logic may require that a CVM—either active or passive—be performed. The process may then loop from block 421 to decision blocks 404 (FIG. 4A), 408, etc.

However, if—even with the new transaction amount—the passive CVM accumulator would remain below the relevant limit(s), then the process flow may advance from decision block 420 to block 422. At block 422, the current transaction is allowed to proceed (i.e., without requiring a CVM), and the accumulators for the active and passive CVMs are incremented to reflect the current transaction. The process then may loop from block 422 to the loop of decision blocks 404, 408, 412 (FIG. 4A).

Assuming that the limit(s) applicable to the passive CVM accumulator(s) is (are) set lower than the limit(s) applicable to the active CVM accumulator(s), the process flow logic expressed in FIGS. 4A and 4B would have the following consequences: For transactions above the "low value" threshold, active CVM would always be required. As long as passive CVM is successfully maintained, a certain number and/or cumulative amount of low value transactions would be permitted before an active CVM was required to be performed. If passive CVM success is not present, then only a smaller number and/or cumulative value of low value transactions would be permitted before requiring an active CVM to be performed. With this arrangement, for example, the payment card account issuer has the opportunity to set its risk management strategy with greater granularity than would be possible if the payment-enabled smartphone 102 did not have the passive CVM capability as described in this disclosure.

From another point of view, a process such as that illustrated in FIGS. 4A and 4B can be partially summarized as follows: (A) Two transaction-number limits are established, with one of the limits lower than the other; (B) An active CVM requirement is applied when the lower limit is exceeded, unless a passive CVM condition has been satisfied; (C) When the higher limit is exceeded, the active CVM requirement is applied even if the passive CVM condition has been satisfied.

In the above discussion and in the appended claims, the term "transaction-number limit" should be understood to include either or both of a limit on a number of transactions and a limit on a cumulative amount of transactions.

Details of passive CVM techniques according to some embodiments will now be discussed. In some embodiments, only a single passive CVM technique is employed. Examples of such a passive CVM technique include: (a) facial recognition analysis (e.g., via one or more images of the user's face captured by the forward facing camera on the smartphone 102); (b) user walking gait analysis, based on data provided from accelerometers that are components of the smartphone 102; (c) voice recognition analysis, based on spoken input by the user into the microphone component of the smartphone 102; (d) user gesture analysis based on interaction by the user with the touchscreen component of the smartphone 102; (e) analysis of the user's heartbeat (e.g., based on data wirelessly transmitted to the smartphone 102 from a wearable heartbeat sensor, such as a wristwatch/wristband—reference numeral 124, FIG. 1—worn by the user); and (f) the user's pattern of usage of application programs on the smartphone 102. This list of possible passive CVM techniques is not intended to be exhaustive.

In some embodiments, the passive CVM strategy employed in the smartphone 102 may rely on a combination of any two or more of such individual passive CVM techniques. Based on ongoing results of the various passive CVM analyses, the smartphone 102 may calculate a running passive CVM score, and may determine whether or not a passive CVM condition is satisfied based on the current value of the CVM score.

FIG. 5 is a flow chart that illustrates an example process that the smartphone 102 may perform in connection with determining whether passive CVM has successfully occurred. As such, the process of FIG. 5 may be considered an example of supplemental details relative to the determination made at decision block 408 in FIG. 4A.

Referring now to FIG. 5, a decision block 502 is shown. At decision block 502, the smartphone 102 may determine whether an activity relevant to passive CVM monitoring is currently occurring. For example, such an activity may include user interaction with the touchscreen, which may make it possible for the forward-facing camera 213 to capture an image of the user's face and/or which may provide input data to a gesture analysis process. As another example, such an activity may include output from the accelerometers that is consistent with the smartphone 102 being carried by someone who is walking. Data output from the accelerometers at such times may be a suitable input for gait analysis.

Further, another suitable activity for possible passive CVM processing may be a telephone call via the smartphone 102. In connection with a phone call, the voice input by the user via the smartphone's microphone may be a suitable input for voice recognition analysis. Other suitable activity may occur simply when the smartphone is present within range to receive wirelessly-transmitted data signals from a heartbeat sensor that is worn by the user. Still further, any interaction by the user with applications on the smartphone 102 may provide input data for an analysis by the smartphone 102 of the user's application usage patterns.

If the smartphone 102 makes a positive determination at decision block 502 (i.e., if the smartphone 102 determines that activity is occurring that is relevant to one or more passive CVM techniques implemented in the smartphone 102), then block 504 may follow decision block 502. At block 504, the smartphone 102 may proceed with an analysis of the input data made available via the relevant activity, and may compare the results of the analysis with reference data that was previously stored in the smartphone 102. As a result of the analysis and comparison, the smartphone 102 may update a passive CVM score that constitutes an evaluation of the likelihood that the smartphone 102 is currently in the possession of the authorized user.

A decision block 506 may follow block 504. At decision block 506, the smartphone 102 determines whether the current level of the passive CVM score indicates that it is reasonable to conclude that the smartphone 102 is in the authorized user's possession. If so, then block 508 may follow. At block 508, the smartphone 102 may set a flag that indicates that passive CVM is currently satisfied, and also may reset a timer that is relevant to passive CVM. The process flow may then loop back from block 508 to decision block 502.

Considering again decision block, if a negative determination is made (i.e., if the smartphone 102 determines that the current level of the passive CVM score is not sufficient to indicate that the smartphone 102 is in the authorized user's possession), then the process flow may proceed via the "no" branch from decision block 506 to decision block 510. At decision block 510, the smartphone 102 determines whether a time-out period has elapsed as to the passive-CVM-satisfied status. If the time-out has occurred, then the process flow may advance from decision block 510 to block 512. At block 512, the smartphone 102 may clear the flag that indicates that passive CVM has been satisfied. (It will be appreciated that the state of this flag may in some embodiments indicate the outcome of the determination at decision block 408 in FIG. 4A.)

Referring again to FIG. 5, and considering decision block 502 again, if a negative determination is made at that decision block (i.e., if no activity is occurring that is relevant to CVM processing), then the process flow may advance from decision block 502 to decision block 510. Also, if a negative determination is made in decision block 510 (i.e., if passive-CVM-satisfied status has not timed-out), then the process flow may loop from decision block 510 to decision block 502. It will be appreciated that the decision blocks 502 and 510 may thus form an idle loop (possibly among other processing threads in the smartphone 102) so long as no passive-CVM-relevant activity is occurring and the status time-out has not occurred.

The process flow as illustrated in FIG. 5 suggests that passive CVM processing may go on virtually continuously, so long as relevant activity (i.e., activity that provides meaningful data for passive CVM processing) is occurring. However, this need not necessarily be the case. For example, passive CVM processing may occur only when triggered by certain events, such as: (a) the user waking up the smartphone 102; (b) the user opening a wallet application on the smartphone 102; (c) the user interacting with a payment application on the smartphone 102; (d) the smartphone 102 detecting that it has been carried into a retail store; etc. In some embodiments, passive CVM processing may be turned off/inhibited for a predetermined timed period after a successful completion of an active CVM and/or for a certain number of low value transactions after a successful completion of an active CVM In some embodiments, the resetting of accumulators relevant to passive CVM may occur upon one or more of an online authorization (i.e., confirmation of a PIN or prompted biometric at the issuer server); successful completion of an active (local) CVM; successful completion of a passive CVM; and completion of both an active (local) CVM and a passive CVM.

From previous discussion it will be understood that at least some of the analysis, etc., required for passive CVM may take place "in the cloud", i.e., at the remote server 120 shown in FIG. 1, based on data transmitted thereto from the smartphone 102.

However, even when this is the case, the phrase "performing passive CVM in a mobile device" should still be deemed to apply, provided that at least some of the input data for the passive CVM process is collected and/or generated in the smartphone 102. In some embodiments with passive CVM processing at least partially occurring "in the cloud", the smartphone 102 may transmit hashes and/or details of passively obtained biometric readings to the remote server 120.

Aspects of the disclosure have been described above in the context of a smartphone. However, the principles of the present disclosure are equally applicable to other types of mobile devices, including tablet computers.

Software that provides the passive CVM functionality described herein may be included in the above-mentioned payment application 252 (FIG. 2A) and/or may be stored in one or more other program memory components of the smartphone 102 and may program one or more processing components of the smartphone 102.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" refers to a system for handling purchase transactions and related transactions. An example of such a system is the one operated by MasterCard International Incorporated, the assignee of the present disclosure. In some embodiments, the term "payment card system" may be limited to systems in which member financial institutions issue payment card accounts to individuals, businesses and/or other organizations.

Although the present disclosure has been described in connection with specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method comprising:
   providing a mobile device, the mobile device including at least one CVM (cardholder verification method) data source, the at least one CVM data source including at least one of a microphone, a camera, a gyroscope, an accelerometer and a touchscreen;
   receiving CVM data from the at least one CVM data source, said CVM data indicative of at least one characteristic and/or attribute of a user of the mobile device;
   initiating a CVM data evaluation process using the received CVM data as an input, the CVM data evaluation process being initiated, performed and completed without the user being or having been prompted to submit input to the at least one CVM data source in connection with performance of said CVM data evaluation process, said CVM data evaluation process being performed by a processing device in communication with the at least one CVM data source; and
   providing a result of the CVM data evaluation process, wherein the user's at least one characteristic and/or attribute is indicated by at least one of (a) facial recognition; (b) gait analysis; (c) gesture analysis; (d) voice recognition; and (e) heartbeat analysis.

2. The method of claim 1, further comprising:
   resetting a CVM accumulator in response to successful completion of the CVM data evaluation process.

3. The method of claim 2, wherein the CVM accumulator is in a secure element in the mobile device.

4. The method of claim 2, wherein the CVM accumulator is maintained in a server computer that is remote from the mobile device.

5. The method of claim 1, wherein:
   a payment application runs in a secure element in the mobile device; and
   at least one payment credential is stored in the secure element.

6. The method of claim 1, wherein a payment application runs on a main processor of the mobile device.

7. The method of claim 1, wherein the mobile device interacts with a remote server in connection with the CVM data evaluation process.

8. The method of claim 1, wherein the CVM data evaluation process relates to at least two of: (a) facial recognition; (b) gait analysis; (c) gesture analysis; (d) voice recognition; and (e) heartbeat analysis.

9. The method of claim 8, wherein the CVM data evaluation process relates to at least three of: (a) facial recognition; (b) gait analysis; (c) gesture analysis; (d) voice recognition; and (e) heartbeat analysis.

10. The method of claim 1, wherein the mobile device is a smartphone.

11. A method comprising:
    providing a mobile device, the mobile device including at least one CVM (cardholder verification method) data source, the at least one CVM data source including at least one of a microphone, a camera, a gyroscope, an accelerometer and a touchscreen;
    receiving CVM data from the at least one CVM data source, said CVM data indicative of at least one characteristic and/or attribute of a user of the mobile device;
    initiating a CVM data evaluation process using the received CVM data as an input, the CVM data evaluation process being initiated, performed and completed without the user being or having been prompted to submit input to the at least one CVM data source in connection with performance of said CVM data evaluation process, said CVM data evaluation process being performed by a processing device in communication with the at least one CVM data source;
    providing a result of the CVM data evaluation process, wherein the user's at least one characteristic and/or attribute is indicated by at least one of (a) facial recognition; (b) gait analysis; (c) gesture analysis; (d) voice recognition; and (e) heartbeat analysis;
    setting a passive CVM flag in response to the result of the CVM data evaluation process;
    storing a first accumulator in the mobile device, the first accumulator for counting up to a number of payment transactions permitted to be performed using the mobile device at a time when the passive CVM flag is set and without requiring entry of a PIN (personal identification number) by the user of the mobile device; and
    storing a second accumulator in the mobile device, the second accumulator for counting up to a number of payment transactions permitted to be performed using the mobile device at a time when the passive CVM flag is not set.

12. A method comprising:

providing a mobile device, the mobile device including at least one CVM (cardholder verification method) data source, the at least one CVM data source including at least one of a microphone, a camera, a gyroscope, an accelerometer and a touchscreen;

receiving CVM data from the at least one CVM data source, said CVM data indicative of at least one characteristic and/or attribute of a user of the mobile device;

initiating a CVM data evaluation process using the received CVM data as an input, the CVM data evaluation process being initiated, performed and completed without the user being or having been prompted to submit input to the at least one CVM data source in connection with performance of said CVM data evaluation process, said CVM data evaluation process being performed by a processing device in communication with the at least one CVM data source; and providing a result of the CVM data evaluation process, wherein the user's at least one characteristic and/or attribute is indicated by at least one of (a) facial recognition; (b) gait analysis; (c) gesture analysis; (d) voice recognition; and (e) heartbeat analysis;

said initiating of the CVM data evaluation process being in response to at least one of: (a) the mobile device transitioning from a sleep state to a waking state; (b) the user opening a wallet application on the mobile device; (c) the user interacting with a payment application on the mobile device; and (d) the mobile device detecting that it has been carried into a retail store.

* * * * *